Jan. 26, 1971 — C. E. DE YOUNG — 3,558,482
WATER PURIFICATION
Filed July 31, 1968 — 2 Sheets-Sheet 1
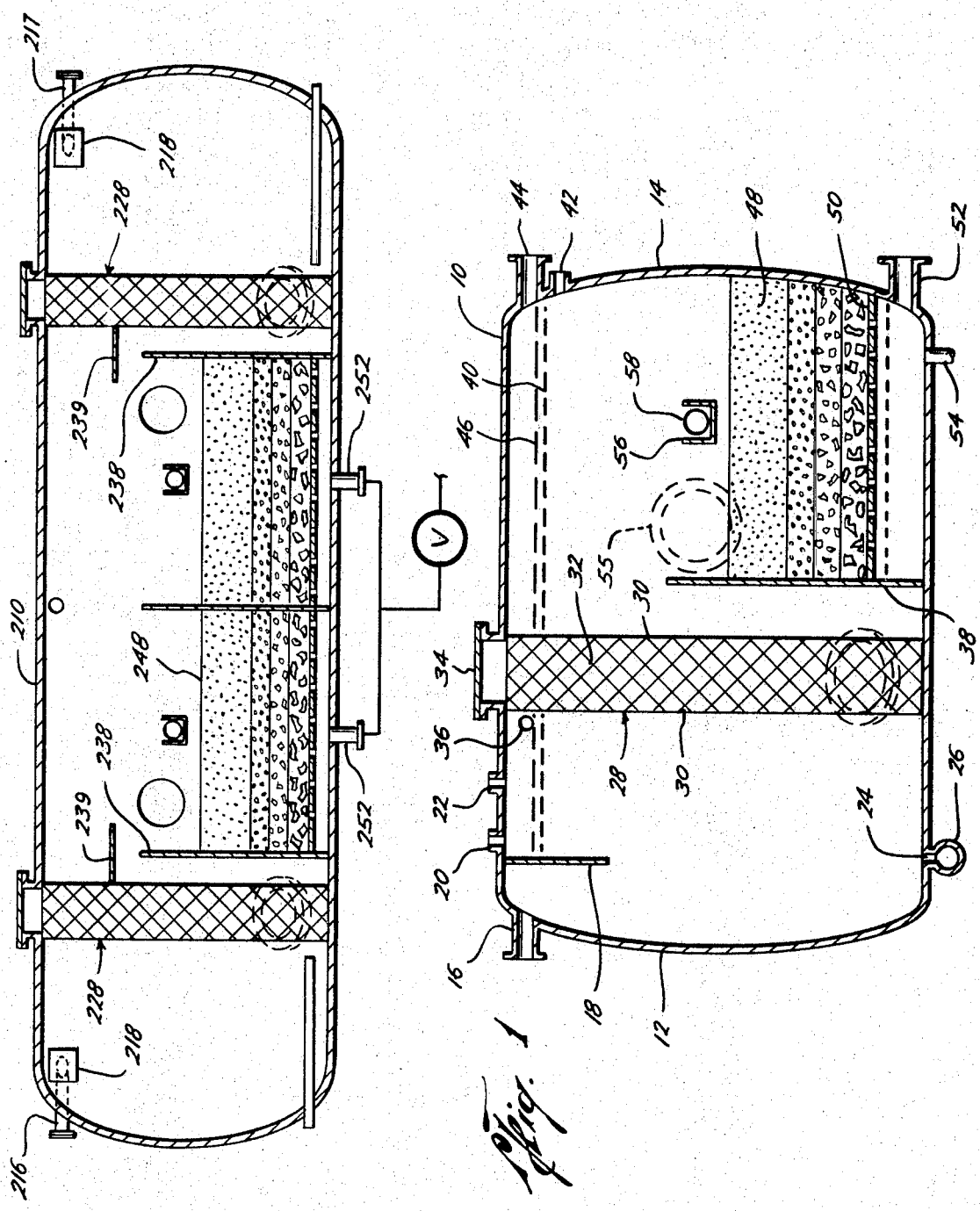
Charles E. DeYoung
INVENTOR.
BY 
ATTORNEY

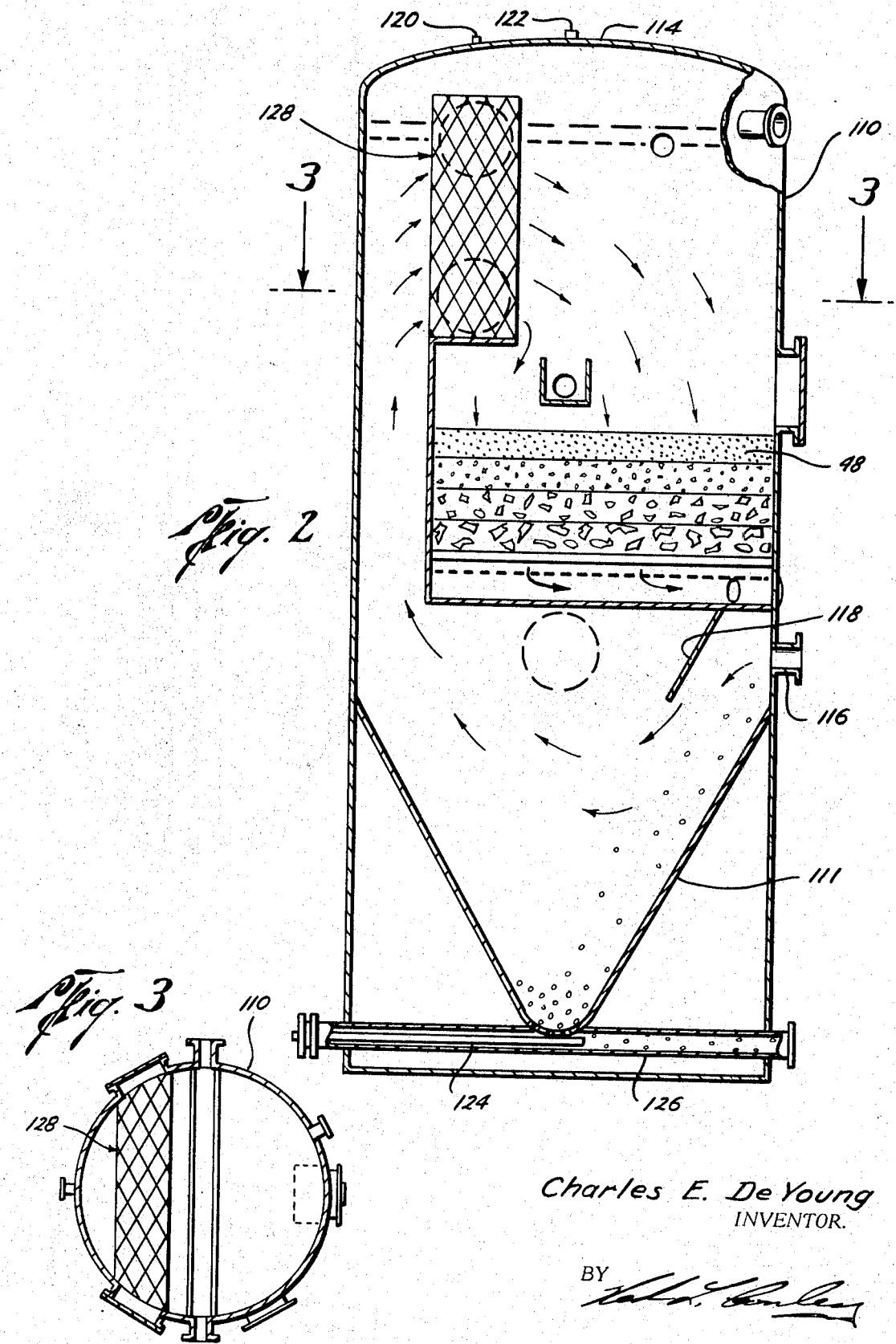

United States Patent Office

3,558,482
Patented Jan. 26, 1971

3,558,482
WATER PURIFICATION
Charles E. De Young, Houston, Tex., assignor to Smith Industries, Inc., Houston, Tex., a corporation of Texas
Filed July 31, 1968, Ser. No. 749,146
Int. Cl. B01d 13/00
U.S. Cl. 210—23                                                     13 Claims

ABSTRACT OF THE DISCLOSURE

A system and method for removal of oil, sand and other impurities from water, wherein water containing such impurities is moved at a very low velocity to allow heavy solid particles to drop out and light solid particles to float to the surface where they may be removed, the water then being passed through a filter wall which is preferentially wetted by oil so that diffused oil particles in the water will coalesce on the filter material to make large oil particles which are washed loose from the filter material. These large oil particles are then directed upwardly toward an oil layer on top of the water, and the water is then moved downwardly at a velocity lower than the escape velocity of the oil particles, thereby allowing the oil particles to float upwardly to the oil layer. The water is then preferably passed through a granular filter bed of graphite or the like before being removed from the container as clean water.

BACKGROUND OF THE INVENTION

(1) Field of the invention

This invention relates to apparatus and methods for removal of undissolved liquid and solid pollutants from water.

(2) Description of the prior art

In the production of petroleum large quantities of salt water are often produced along with the petroleum. Sometimes this water can be injected back into the formation, and at other times it is disposed of on the surface. However, to prevent the plugging of subsurface formations, and the pollution of surface or subsurface waters it is necessary to remove certain pollutants from the water. For example, such water often contains particles of sand, small diffused droplets or particles of oil, and particles of sticky semi-solids consisting primarily of a mixture of paraffin and iron sulfide. Recent stringent governmental regulations prohibit surface disposal of water having enough oil in it to make a visible (iridescent) slick. Subsurface disposition also requires the removal of substantial proportions of these pollutants.

In the past it has been known to use various kinds of filters to remove such pollutants from the water. One form of filter which has been used consists of a graded bed of sand or graphite ore through which the water is passed to trap pollutants in the filter. Such filter beds are often designed to cause coalescence of the oil. However, the oil and the paraffin-iron sulfide mixture tend to quickly plug such a filter bed so that it must frequently be backwashed. Such filter systems are, therefore, suitable for only intermittent operation, and it is usually necessary to have at least two systems operating alternately if the water must be handled continuously.

It has also been known to remove such pollutants by means of a filter consisting of a porous wall packed with a packing material such as wood excelsior which is wetted with a material having an affinity for oil. This may consist of another oil or an acid oil such as tall oil. In these the minute oil particles carried by the water are adsorbed on the packing material until a number of small particles are coalesced into a larger particle. The flow of water through the packing material then breaks the oil particle loose from the packing material and carries it from the filter. The particles thus formed are large enough to have a tendency to float to the top of the water to form an oil layer which may be withdrawn from the surface of the water.

Such filter walls do not become plugged with oil, but they are readily plugged by sand and the paraffin-iron sulfide mixture. Furthermore such filters are very difficult to backwash, so that when they become plugged it is necessary to remove the packing material and either clean it or replace it.

SUMMARY OF THE INVENTION

According to the present invention an apparatus and method are provided by which lighter than water pollutants such as oil and the paraffin-iron sulfide mixture often found in oilfield salt water may be substantially completely removed from water without frequent shutdowns of the equipment for backwashing or for replacing packing material. In a preferred embodiment of the invention an oleospecific adsorbent packing material is used in a filter wall to cause coalescence of the oil particles, and the container through which the polluted water flows is proportioned so that the water moves at a very slow velocity before it reaches the filter wall, thereby causing sand particles to drop out and paraffin-iron sulfide particles to float to the surface where they may be removed before they can plug the filter. In such preferred embodiment, the coalesced oil particles washed from the filter are directed upwardly at a relatively higher velocity toward an oil layer on top of the water, the oil particles thus joining the oil layer while the water is moved downwardly at a very low velocity so that the coalesced oil particles can float upwardly toward the oil layer. Such an operation usually removes enough of the oil that an oil-slick-free water is obtained. However, in a still further preferred embodiment the water is then passed through a granular filter bed to filter out any remaining pollutant in the water. Since the sand and paraffin-iron sulfide materials have been removed previously, neither the packed filter nor the filter bed are plugged by these materials. Furthermore, since substantially all of the oil has been removed by the packed filter the filter bed is not plugged by the oil. Consequently the filter bed may be operated for long periods of time without any necessity of backwashing.

BRIEF DESCRIPTION OF THE DRAWING

FIG. 1 is a somewhat schematic vertical longitudinal sectional view of one embodiment of apparatus of this invention suitable for practicing a preferred embodiment of the method of this invention;

FIG. 2 is a vertical sectional view of another embodiment of apparatus according to this invention;

FIG. 3 is a horizontal sectional view of the embodiment of FIG. 2 taken at line 3—3 of FIG. 2;

FIG. 4 is a vertical longitudinal sectional view of still another embodiment of the invention.

DESCRIPTION OF THE PREFERRED EMBODIMENTS

In the embodiment of the invention shown in FIG. 1 of the drawing a container 10 comprises a cylindrical tank having a horizontal longitudinal axis and pressure heads 12 and 14. Near the top of the pressure head 12 an inlet 16 is provided. A baffle plate 18 is positioned in the path of fluid flowing into the container from the inlet 16, being spaced away from the inlet a short distance, as for example from a few inches to a foot or more, and extends downwardly from the top of the tank to a position substantially below the inlet. This baffle serves to deflect the flow of liquid into the tank downwardly to prevent turbulence in the upper portion of the tank. Just to the right of baffle 18 there is a gas inlet pipe 20 through which gas may be put into the tank to provide a pressure head above the liquid. A pressure relief line 22 is provided with a suitable safety valve (not shown) to prevent over-pressuring the tank.

At the bottom of the tank near the pressure head 12 there is a sand outlet 24 connected to a sand drain line 26. A water jet or the like (not shown) may be used to expel sand from this line.

To the right of the preceding structure, as shown in the drawing, there is positioned a porous filter wall 28 which is constructed of a pair of spaced apart gratings 30 which may, for example, be made of expanded metal. The space between the gratings 30 is packed with a packing material 32, the packing material comprising an oleospecific adsorbent material, i.e. one which is preferentially wetted by oil. Such a materal may, for example, comprise excelsior which is prewetted with oil or an acid oil such as tall oil. A preferred packing material is a shredded polymer such as polyethylene or polypropylene, which are wetted by oil but not by water. A manhole 34 is provided through which the packing may be inserted and removed. The packing is preferably packed tightly enough to insure a substantial pressure drop through the porous wall.

To the left of the porous wall and near the top of the container there is provided an outlet pipe 36 for a purpose which will hereinafter be explained.

Immediately downstream (to the right in the drawing) of the porous wall 28 there is provided a vertical baffle plate 38 which extends upwardly from the bottom of the tank. The baffle plate is shown as extending to a point somewhat above the center line of the tank, but it may also extend substantially above that point to a level near the maximum water line 40. The maximum water line 40 is determined by a liquid level control device (not shown) connected at line 42. Such devices are well known in the art, and need not be described here. Just above the liquid level control line, and in the pressure head 14, there is provided an outlet line 44 for gas and oil, through which oil may be withdrawn continuously or intermittently. The oil level in the container is indicated by line 46.

In the space between the baffle plate 38 and the pressure head 14 a filter bed 48 is supported upon a grating 50. The grating 50 is positioned above the bottom of the tank so as to leave a space for fluid to flow to a clean water outlet 52 positioned near the bottom of the tank. The bottom of the tank is also provided with a drain line 54 which may be opened when necessary to completely drain the tank. A manhole 55 in the side of the tank may be used to install and remove the filter material in the filter bed 48. Just above the filter bed there is a backwash trough comprising a U-shaped member 56 extending transversely of the tank and having an outlet line 58 leading out of the tank.

It will be noted that the cross-sectional area of the tank between the pressure head 12 and the porous wall 28 is quite large in comparison to the inlet pipe 16. This cross-sectional area is preferably such that the flow velocity between the inlet and the porous wall 28 is low enough that solid particles having a density greater than water, such as sand and the like, will drop out of the water in this area. It has been found that if the flow rate is no more than about three gallons per minute per square foot (five inches per minute) a substantial proportion of such heavy particles will fall out. Preferably the zone of low velocity flow is long enough for the heavy particles to drop to the bottom before the water reaches the porous wall 28. A distance of about two and one-half feet or more between the pressure head 12 and the porous wall 28 has been found to be sufficient for this purpose.

Oilfield salt water also often contains a paraffin-iron sulfide mixture which is a semi-solid sticky material lighter than water, and is carried in relatively small particles in the water. During the low velocity movement of the water before reaching the porous wall 28 these particles will rise to the top of the water and collect on the surface adjacent the porous wall. A blow down outlet 36 is provided for blowing off this material from time to time to prevent an excessive buildup. Because of the sticky nature of the material it will cause some plugging of the porous wall at the upper surface of the water.

In the porous wall the packing which is preferentially wetted by oil will adsorb small dispersed oil particles in the water. These oil particles are of such small size that they would remain suspended in the water unless the water were left in a settling tank for a long period of time. As the oil builds up on the packing material it eventually reaches the point that the velocity of flow through the packing will break loose droplets or larger particles of oil and carry them through the packing material and into the space between the wall 28 and the barrier 38. A chemical to improve coalescense, such as those marketed by Betts Laboratory, may if desired, be injected upstream of the porous wall.

As has previously been stated, wood excelsior wetted with oil provides a satisfactory packing material. However, a more permanent packing material can be made from an oleospecific polymer such as polyethylene, polypropylene and other polyolefins. These materials adsorb oil and will therefore cause the coalescense of oil particles necessary to form the larger particles or droplets in the porous wall.

The coalesced oil particles are carried into the space between the porous wall and the barrier 38. The barrier is preferably positioned fairly close to the porous wall so that the horizontal cross-sectional area between the barrier and the wall is substantially less than the cross-sectional area of the tank. The water together with coalesced oil particles flows upwardly in this area so that its flow velocity is much greater than the velocity of the water flow upstream of the porous wall. This greater velocity not only prevents any solid particles remaining from falling to the bottom of the tank but it also imparts an upward momentum to carry the water containing the coalesced oil particles toward the upper surface of the liquid in the tank, so that the oil particles have less distance to travel to reach the surface of the water to form an oil layer thereon. The wall also prevents turbulence in the area of the filter bed.

A large quiescent area is provided between the barrier 38 and the pressure head 14 to reduce the flow velocity in this area. Thus flow velocities are kept low enough that the coalesced oil particles will float to the top of the water and form an oil layer on top of the water. It will be noted that in the area between the barrier 38 and the head 14 the water is flowing downwardly. Therefore it is highly desirable that the velocity of downward flow be less than the escape velocity of the oil particles. By "escape velocity" is meant the velocity of upward movement of the coalesced oil particles relative to the water. It will be appreciated that this escape velocity is dependent upon the relative densities of the oil and the water as well as the size of the oil particles. It has been found that a downward flow rate of not more than about three gallons per minute per square foot of area (five inches per minute velocity) is low enough to allow substantially all of the coalesced oil particles to float up to the oil layer.

In many applications the water at this point will be clean enough to meet standards which have been established for surface disposal of water. Such standards require removal of oil to the extent that there is no oil slick on standing water. This means that the oil content must be reduced to no more than about 30 parts per million, since oil contents greater than this form a visible iridescent film.

However, in some instances oil dispersion is so great that even after the previously described treatment there is still an undesirable amount of oil in the water. In such instances it is advantageous to pass the water through a granular filter bed 48.

Such filter beds may be prepared from anthracite ore or graphite ore or other materials known in the art and usually comprise a number of beds of granular material of different grades, the smallest grain size being in the uppermost layer and the longest grain size being in the lowermost layer. The slow water velocity of not more than about five inches per minute is advantageous for such beds because the pollutants are not driven so deeply into the bed and are therefore more easily removed by backwashing. When such a granular bed follows the porous wall and other apparatus previously described, the beds may operate for long periods of time without backwashing. However, when such filter beds have been used without the previously described apparatus it has often been necessary to backwash every few hours.

If the filter bed does eventually become plugged it may be cleaned by flowing a washing material in through the clean water outlet 52 and taking the water out through the backwash trough 56 and outlet 58 associated therewith.

It should be apparent that apparatus for practicing the process of this invention may take many and varied forms and that it is not possible to disclose herein all of such forms. FIGS. 2 and 3, however, disclose one possible modification. In the form shown in these figures the container 110 is in the form of a vertical axis cylinder having a conical hopper type bottom 111. The upper end of the container is covered by pressure cap 114. Water flows into the container through the inlet pipe 116, is diverted downwardly by the baffle 11 and flows across a large cross-sectional area at a velocity low enough for sand to drop out. The sand drops into an outlet line 126 and is removed by a water jet introduced through a line 124. Having passed through this low velocity zone the water moves upwardly at a higher velocity to a porous wall 128 which is similar in all respects to the porous wall 28 shown in FIG. 1. A gas inlet line 120 and pressure relief line 122 are provided to maintain the desired pressure in the head of the tank.

In this embodiment of the invention the water with coalesced oil passes from the porous wall directly into the quiescent zone formed by the large cross-sectional area above the filter bed 148. Since all of the porous wall is above the filter bed there is less likelihood of coalesced oil particles being carried downwardly to the filter bed.

FIG. 4 discloses what is in effect two units of the type shown in FIG. 1 joined together for increased capacity. As there shown a single container 210 has two water inlets 216 and 217 each of which feeds water in against a baffle 218. Two porous walls 228 are provided, and each porous wall has associated therewith a vertical baffle 238. In this embodiment a horizontal baffle 239 is positioned spaced above the upper edge of baffle 238. The filter bed 248 is shown as being divided into two sections, although it will be apparent that a single filter bed and a single clean water outlet 252 might well be used.

It is apparent that the apparatus and method of this invention provide an improved method of removing pollutants from water such as oilfield salt water. By the method of this invention the water can be purified to the extent that it is suitable either for disposal on the surface or for injection back into the ground through disposal wells. The removal of substantially all oil from the water not only avoids any difficulties with regulations prohibiting an oil slick on water disposed of on the surface, but the removal of solids and semisolids insures that the water can be injected back into the ground without the danger of plugging up formations into which the water is injected. Furthermore substantial amounts of oil which would otherwise be lost are recovered by the process of this invention.

These results are accomplished by means of equipment which can operate efficiently for extremely long periods of time as compared to equipment previously used for water clarification. The novel combinations of elements in the apparatus of this invention insure that the filtering devices cannot become quickly plugged by materials in the water. Materials which cause plugging of a filter are removed before they reach the filter, and the filters are used only for the specific jobs for which they were designed. The use of substantially quiescent zones of low flow velocities insures a separation of pollutants at a location which will insure that such pollutants do not interfere with the activity of the filters.

Thus, there has been provided an apparatus and method by which substantially all dispersed oil may be removed from water in a continuous process by means of equipment which only very rarely needs attention.

Many modifications of the apparatus disclosed herein and of the method of this invention will be apparent to those skilled in the art and many other forms of apparatus may be used for practicing the method. The invention is therefore not limited to the specific embodiments shown and described herein, but only as set forth by the appended claims.

I claim:

1. A process for separating lighter-than-water pollutants in discontinuous phase from water in continuous phase comprising passing water containing a discontinuous phase of lighter-than-water pollutant dispersed in small particles therein through a porous wall formed of a material which will cause coalescing of said particles, passing the water containing coalesced particles into a relatively quiescent pool, whereby a substantial portion of the coalesced particles float to the top of the pool, removing substantially all the oil from the top of the pool and then passing the water through a granular filter bed to remove any remaining pollutants.

2. A process as defined by claim 1, wherein the pollutants include oil and a paraffin-iron sulfide mixture, and wherein this mixture is removed from the water before the water contacts the porous wall.

3. A process as defined by claim 1 wherein the water is moved at a velocity of no more than about five inches per minute for a period before it is passed through the porous wall.

4. Apparatus for separating lighter-than-water pollutants in discontinuous phase from water in continuous phase comprising a container, an inlet for introducing water containing lighter-than-water pollutants to said container, a pollutant outlet in an upper portion of said container, a water outlet in a lower portion of said container, a porous wall comprising a material having an affinity for the discontinuous phase intermediate said inlet and said outlets, to cause coalescence of pollutants when the polluted water flows through it, and a filter bed containing graded granular filter materials intermediate said porous wall and said water outlet.

5. Apparatus as defined by claim 4 wherein the container has a cross-sectional area between the inlet and the porous wall sufficient to reduce the flow velocity to no more than about five inches per minute.

6. Apparatus as defined by claim 5 wherein the porous wall material is an oleospecific polymer.

7. Apparatus as defined by claim 5 and including means intermediate said inlet and said porous wall for removing sand and paraffin-iron sulfide mixtures from the water.

8. Apparatus as defined by claim 5 wherein
the container has an area transverse to the direction of flow of water to the water outlet sufficient to reduce the velocity of the flow to the water outlet to no more than about five inches per minute.

9. A process for separating lighter-than-water pollutants in discontinuous phase from water in continuous phase comprising
passing water containing a discontinuous phase of lighter-than-water pollutant dispersed in small particles therein through a porous wall,
coalescing particles of pollutant to form larger particles,
directing the flow of water and larger particles from the porous wall upwardly to merge with a relatively quiescent pool of water having a layer of said pollutant on it,
withdrawing said pollutant from said layer,
passing the water downwardly through a granular filter bed, and
withdrawing the water from the pool at a point substantially below said layer.

10. A process as defined by claim 9 wherein the pollutants include oil and a mixture of paraffin and iron sulfide, wherein paraffin-iron sulfiide mixture is removed from the water before the water contacts the porous wall.

11. Apparatus for separating lighter-than-water pollutants in discontinuous phase from water in continuous phase comprising
a container,
an inlet for introducing water containing lighter-than-water pollutants to said container,
a pollutant outlet in an upper portion of said container,
a water outlet in a lower portion of said container,
a porous wall comprising a material having an affinity for the discontinuous phase intermediate said inlet and said outlets, to cause coalescence of pollutants when the polluted water flows through it,
a wall downstream of said porous wall extending from adjacent the bottom of the container and terminating at a level substantially above the water outlet but below the pollutant outlet, whereby the water and coalesced polltuant particles washed from the porous wall are directed upwardly away from the water outlet to carry the pollutant particles to near the upper portion of the container, and
a granular filter in said container positioned so that water from which coalesced particles have been removed must flow through the filter to reach the water outlet.

12. Apparatus as defined by claim 11 wherein
the container has an area transverse to the direction of flow of water to the water outlet sufficient to reduce the velocity of the flow to the water outlet to no more than about five inches per minute.

13. Apparatus as defined by claim 12 wherein
the container has a cross-sectional area between the inlet and the porous wall sufficient to reduce the flow velocity to no more than about five inches per minute.

References Cited
UNITED STATES PATENTS

| | | | |
|---|---|---|---|
| 2,403,838 | 8/1946 | Lawson et al. | 210—C.D(UX) |
| 2,731,150 | 1/1956 | McCann | 210—23X |
| 2,782,929 | 2/1957 | Colket | 210—320X |
| 3,179,603 | 4/1965 | Edwards et al. | 210—23X |
| 3,417,015 | 12/1968 | Canevari et al. | 210—73X |
| 3,450,632 | 6/1969 | Olson et al. | 210—73X |

JOHN ADEE, Primary Examiner